US005605636A

United States Patent [19]
Wyness

[11] Patent Number: 5,605,636
[45] Date of Patent: Feb. 25, 1997

[54] LIQUID CLARIFICATION DEVICE AND METHOD

[75] Inventor: David Wyness, Springfield, Ill.

[73] Assignee: McNish Corporation, Aurora, Ill.

[21] Appl. No.: 425,436

[22] Filed: Apr. 20, 1995

[51] Int. Cl.⁶ ................................................ B01D 21/24
[52] U.S. Cl. ...................... 210/801; 210/802; 210/195.3; 210/519; 210/521
[58] Field of Search .................... 210/519, 521, 210/195.3, 197, 532.1, 540, 801, 802

[56] References Cited

U.S. PATENT DOCUMENTS

| | | | |
|---|---|---|---|
| 863,168 | 8/1907 | Griswold, Jr. | 210/521 |
| 2,264,139 | 11/1941 | Montgomery et al. | |
| 2,635,758 | 4/1953 | Walker . | |
| 3,364,664 | 1/1968 | Doane . | |
| 4,059,529 | 11/1977 | McGivern | 210/519 |
| 4,089,782 | 5/1978 | Huebner | 210/522 |
| 4,120,796 | 10/1978 | Huebner | 210/522 |
| 4,120,797 | 10/1978 | Huebner | 210/522 |
| 4,144,170 | 3/1979 | Dunkers | 210/532.1 |
| 4,146,471 | 3/1979 | Wyness | 210/207 |
| 4,202,778 | 5/1980 | Middelbeek | 210/532.1 |
| 4,477,344 | 10/1984 | Olszewski et al. | 210/521 |
| 4,722,800 | 2/1988 | Aymong | 210/521 |
| 4,948,518 | 8/1990 | Turgay | 210/521 |
| 4,995,979 | 2/1991 | Versteegh | 210/521 |
| 5,244,573 | 9/1993 | Horisawa | 210/519 |
| 5,378,378 | 1/1995 | Meurer | 210/519 |
| 5,453,197 | 9/1995 | Strefling | 210/519 |

FOREIGN PATENT DOCUMENTS

| | | | |
|---|---|---|---|
| 2752296 | 5/1979 | Germany | 210/521 |
| 1636011 | 3/1991 | U.S.S.R. | 210/521 |
| 1710517 | 7/1992 | U.S.S.R. . | |
| 2050338 | 2/1980 | United Kingdom . | |

OTHER PUBLICATIONS

Great Lakes Environmental Inc. brochure.

*Primary Examiner*—Christopher Upton
*Attorney, Agent, or Firm*—Lee, Mann, Smith, McWilliams, Sweeney & Ohlson

[57] ABSTRACT

A method and a device for clarifying liquid by separating particles from a mixture of particles and liquid. The clarifying device includes a housing having an inlet port, a first outlet port and a second outlet port. The housing defines a settling chamber. A first wall member is located within the housing and defines an inlet chamber therein. The inlet port is in fluid communication with the inlet chamber. An adjustable inlet flow passage is formed by the first wall member and includes an opening which is selectively variable in size. The inlet flow passage provides fluid communication between the inlet chamber and the settling chamber. A plurality of settling members are located within the housing above the settling chamber. The liquid within the settling chamber is rotated about a generally horizontal axis by the orientation of the flow passage and deflector members within the housing. Liquid from the settling chamber enters the settling members by changing the direction of its flow by approximately 120°. Clarified liquid which leaves the settling members flows into an outlet chamber and is removed through the first outlet port. The separated particles settle to the base of the clarifying device where the settled particles are removed through the second outlet port.

24 Claims, 2 Drawing Sheets

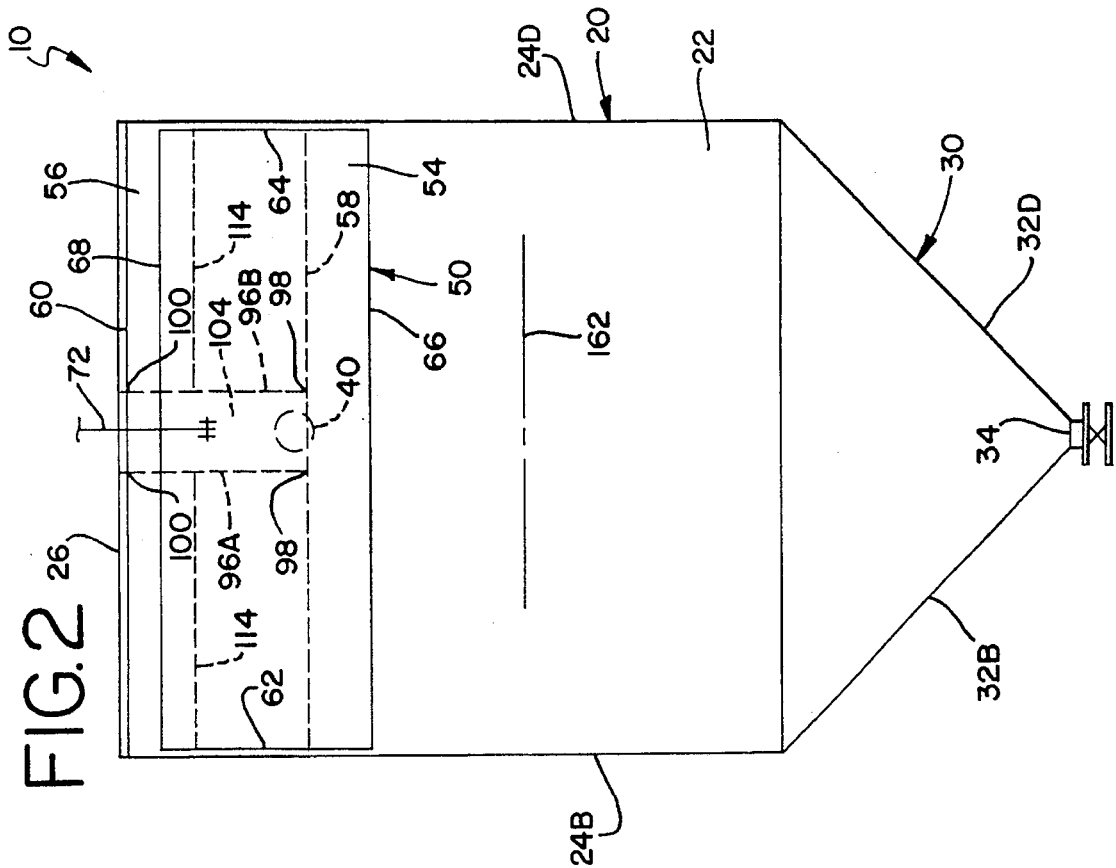
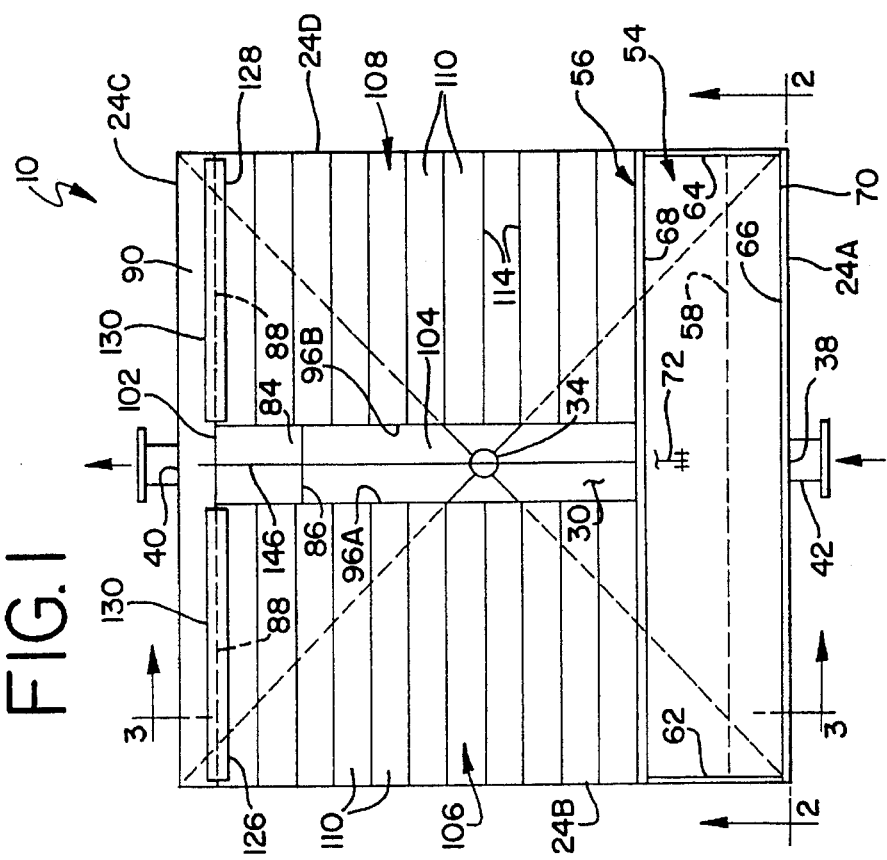

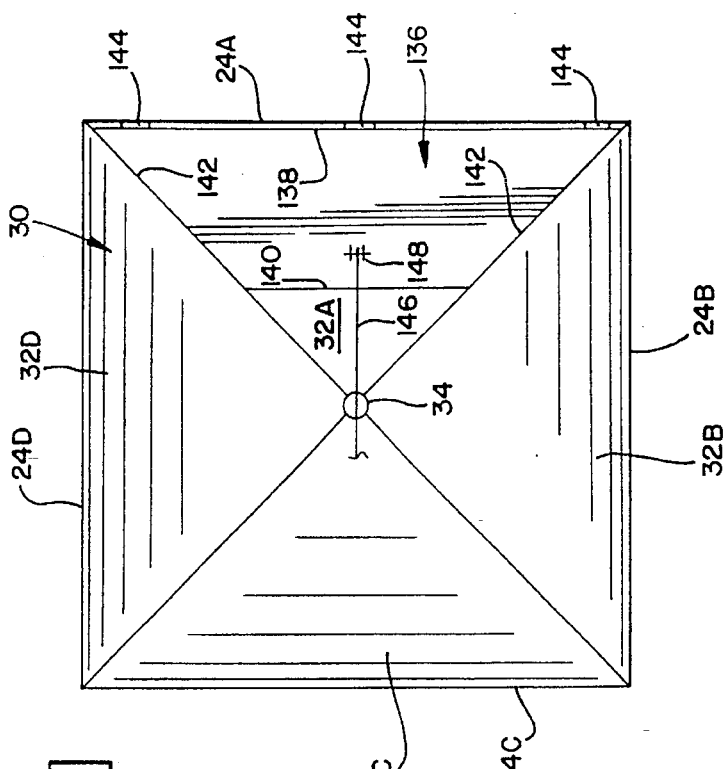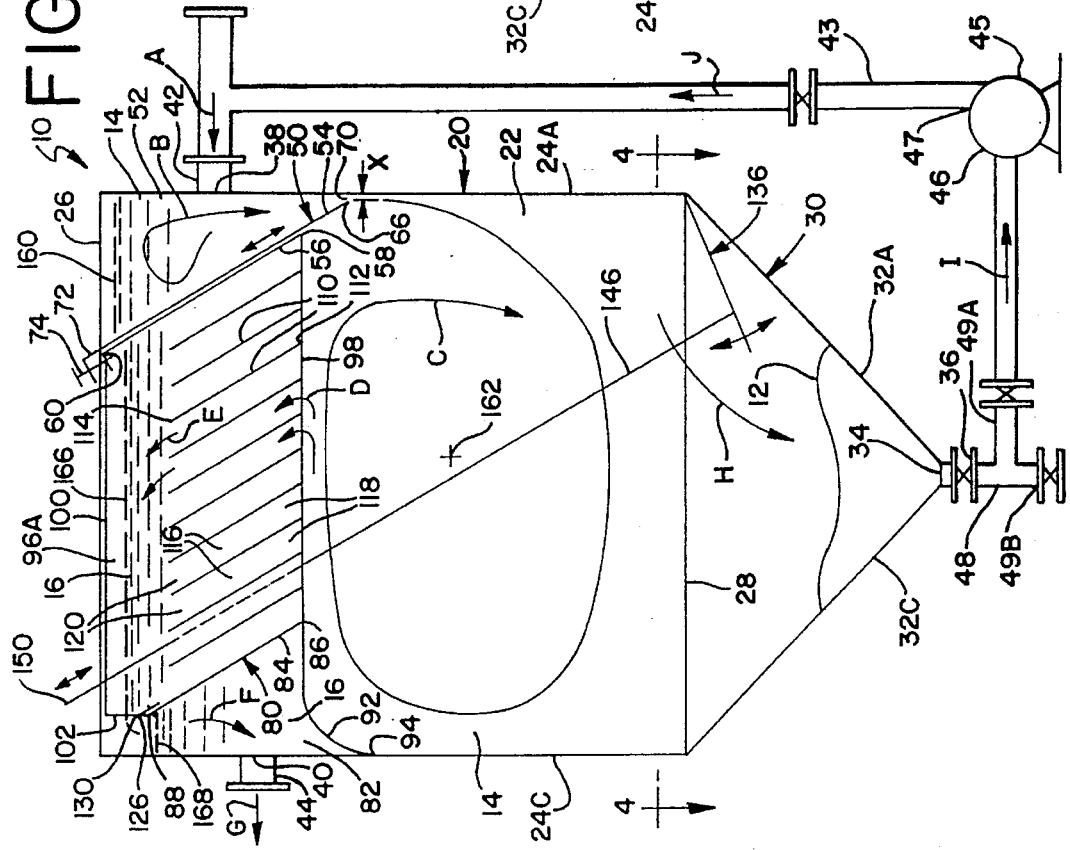

LIQUID CLARIFICATION DEVICE AND METHOD

BACKGROUND OF THE INVENTION

The present invention is directed to a method and a device for clarifying liquids and in particular to a method and a device for separating particles from a mixture of particles and liquid.

Liquids, such as water, often contain undesired substances such as suspended solids or organic matter, hereinafter referred to generally as particles. When the particles have a greater specific gravity than the specific gravity of the carrier liquid, such particles may be separated from the liquid mixture to form clarified liquid by gravitational settling of the particles. Clarifying devices have been used in the treatment of water and wastewater for the gravitational settling and separation of particles from liquid due to differences in specific gravity. In some cases, where the particles are fine in size, the particles may not settle and may remain in suspension within the liquid. Flocculation is used to effectively agglomerate very fine particles into larger and heavier particles and thus increase their rate of settling or separation from the liquid. Flocculation is a process of bringing together fine particles so that they agglomerate as floc particles. In some cases, fine suspended particles are stable and will not agglomerate without chemical treatment to destabalize them so that they will stick together when flocculated. Chemical additives such as coagulants may be added to the liquid mixture to aid in flocculation.

SUMMARY OF THE INVENTION

The present invention provides a device and a method for separating particles from a mixture of particles and liquid to produce a clarified liquid. The clarifying device includes a housing having an inlet port, a first outlet port and a second outlet port. The housing defines a settling chamber therein. A first wall member is located within the housing and defines an inlet chamber within the housing. The inlet port is in fluid communication with the inlet chamber. An inlet flow passage is formed by a bottom edge of the first wall member or by the bottom edge of a moveable member associated with the first wall member. The inlet flow passage provides fluid communication between the inlet chamber and the settling chamber. When the first wall member is provided with the moveable member, the inlet flow passage includes an opening which may be selectively varied in size to selectively vary the velocity of the liquid mixture which flows into the settling chamber. A plurality of settling members may be located within the housing above the settling chamber. Adjacent settling members form a fluid conduit therebetween, each fluid conduit having a first end in fluid communication with the settling chamber and a second end in fluid communication with the first outlet port. A second wall member is also located in the housing and defines an outlet chamber within the housing. The outlet chamber is in fluid communication with the second ends of the fluid conduits formed by the settling members and with the first outlet port. When the clarifying device is not provided with settling members the outlet chamber is in direct fluid communication with the settling chamber. The housing also includes a base for collecting the particles which have been separated from the liquid mixture by settling. The second outlet port is located in the base. A first flow deflector member is pivotally attached to the housing below the inlet flow passage. A second flow deflector member is formed by the second wall member. A recirculation pump having an inlet connected in fluid communication with the second outlet port and an outlet in fluid communication with the inlet port and the inlet chamber may be provided to recirculate particles which have settled into the base through the settling chamber. The recirculation pump may provide a variable flow rate of particles and fluid into the inlet chamber. Adjustment of the flow rate provided by the recirculation pump will vary the flow rate and the velocity of the liquid mixture flowing through the inlet flow passage into the settling chamber while the opening of the inlet flow passage is maintained at a constant size.

A flow of the liquid mixture is provided through the inlet port of the clarifying device into the inlet chamber. The liquid mixture in the inlet chamber flows through the inlet flow passage into the settling chamber parallel to and adjacent a sidewall of the housing. The first and second flow deflecting members and the inlet flow passage facilitate the rotation of the liquid mixture within the settling chamber about a generally horizontal axis. As the liquid mixture rotates within the settling chamber, particles agglomerate together and settle into the base thereby forming clarified liquid at the top of the settling chamber. When the clarifying device is provided with settling members, the liquid mixture in the settling chamber flows generally horizontally below the lower edges of the settling members. A portion of the liquid in the settling chamber enters the fluid conduits of the plurality of settling members by changing its direction of flow by at least 90° from its direction of flow within the settling chamber. Particles which may not have completely settled out of the liquid in the settling chamber separate from the liquid as the liquid flows into and through the settling members thereby further clarifying the liquid. Clarified liquid flows out of the second ends of the fluid conduits of the settling members and over the second wall member into an outlet chamber. The clarified liquid is removed from the outlet chamber through the first outlet port. The particles which separate from the liquid mixture settle into the base of the clarifying device and are periodically removed therefrom through the second outlet port. Particles which have settled within the base may be recirculated by the recirculation pump at a variable flow rate into the inlet chamber for recirculation through the settling chamber.

DESCRIPTION OF THE DRAWINGS

FIG. 1 is a top plan view of the clarifying device of the present invention.

FIG. 2 is a cross-sectional view taken along lines 2—2 of FIG. 1.

FIG. 3 is a cross-sectional view taken along lines 3—3 of FIG. 1.

FIG. 4 is a cross-sectional view taken along lines 4—4 of FIG. 3.

DESCRIPTION OF THE PREFERRED EMBODIMENTS

The settling and clarifying device 10 of the present invention provides for the separation by specific gravity settling of particles 12 contained in a mixture 14 of liquid and particles to form a clarified liquid 16. The liquid mixture 14 typically includes a liquid such as water, but may include other liquids. The particles 12 contained in the liquid mixture 14 are generally small solids or organic matter held in suspension. The liquid mixture 14 may be water intended for treatment in a process to provide drinking water or wastewater intended for treatment in a process to allow the clarified water to be returned to the environment. One or more additives may be added to the liquid mixture 14. The additives may be a coagulant such as alum or other flocculating agents.

The clarifying device 10 includes a housing 20 which defines a generally hollow settling chamber 22 therein. The housing 20 includes four generally rectangular and planar vertical sidewalls 24A–D such that the housing 20 is square or rectangular when viewed in plan as shown in FIG. 1. Each sidewall 24A–D includes a top edge 26 and a bottom edge 28. The housing 20 may be formed in alternative geometric shapes such as circular if desired. The housing 20 also includes a generally conical or pyramidal base 30 including four generally triangular-shaped walls 32A–D. The base 30 is connected to the bottom edges 28 of the sidewalls 24A–D. The walls 32A–D of the base 30 slope downwardly and inwardly add converge at an outlet port 34 that is in fluid communication with the settling chamber 22. A valve 36 is in fluid communication with the outlet port 34. The housing 20 also includes an inlet port 38 formed in the sidewall 24A and an outlet port 40 formed in the opposing sidewall 24C. An inlet pipe 42 is connected to the housing 20 and is in fluid communication with the inlet port 38. An outlet pipe 44 is attached to the housing 20 and is in fluid communication with the outlet port 40. The centerline of the inlet pipe 42 is located at an elevation above the elevation of the centerline of the outlet pipe 44. The top of the housing 20 may be left open, or may be closed by plates. If closed, the top may be provided with doors or hatches to provide selective access to the interior of the housing 20.

The clarifying device 10 may include a recirculation system including a recirculation pump 45 having an inlet 46 and an outlet 47. The inlet 46 of the pump 45 is in fluid communication with the outlet port 34 and the interior of the base 30 through a T-shaped pipe 48. The T-shaped pipe 48 includes an inlet port in fluid communication with the outlet port 34, an outlet port 49A in fluid communication with the inlet 46 of the pump 45 and an outlet port 49B. A pipe 43 provides fluid communication between the outlet 47 of the pump 45 and the inlet port 38. The pump 45 is adapted to provide various rates of flow of liquid and particles between the outlet port 34 and the inlet port 38 as desired.

A first wall member 50 is located within the housing 20 and forms an inlet chamber 52 therein. The first wall member 50 comprises a stationary plate 56. The stationary plate 56 extends across the entire width of the clarifying device 10 between the opposing sidewalls 24B and 24D. The left edge of the stationary plate 56 is attached to the sidewall 24B and the fight edge of the stationary plate 56 is attached to the sidewall 24D. The stationary plate 56 includes a bottom edge 58 and a top edge 60. The stationary plate 56 is generally planar and is sloped at an angle of approximately 60° to the horizontal such that the bottom edge 58 is located closer to the sidewall 24A than is the top edge 60. The top edge 60 is located adjacent to the top edges 26 of the sidewalls 24B and 24D. The stationary plate 56 thereby slopes downwardly and outwardly towards the sidewall 24A and inlet port 38. While the pipe 43 of the recirculation system may provide fluid flow into the inlet chamber 52 through the inlet port 38, the pipe 43 may alternatively be connected to and provide fluid flow into the inlet chamber 52 through another port (not shown) into the inlet chamber 52. In addition, the pipe 43 may alternatively be connected to and provide fluid flow directly into the settling chamber 22 rather than the inlet chamber 52.

The clarifying device 10 may include a moveable plate member 54 associated with the first wall member 50. The movable plate 54 is generally rectangular and planar having a left edge 62, a right edge 64, a bottom edge 66, and a top edge 68. The movable plate 54 rests upon and is parallel to and slidable on the stationary plate 56. The movable plate 54 is sloped at an approximate angle of 30° relative to the sidewall 24A. The left edge 62 is located adjacent the sidewall 24B and the right edge 64 is located adjacent the sidewall 24D. The length of the bottom edge 66 of the movable plate 54 is substantially coextensive with the width of the sidewall 24A of the housing 20. The bottom edge 66 forms an inlet flow passage 70 which provides fluid communication between the inlet chamber 52 and the settling chamber 22. The inlet flow passage 70 has a width which is defined by the distance, shown by the arrow X in FIG. 3, between the bottom edge 66 of the movable plate 54 and the sidewall 24A of the housing 20. The inlet flow passage 70 has a length which extends substantially the entire length of the bottom edge 66 of the movable plate 54 and substantially the entire width of the sidewall 24A of the housing 20. The size of the opening formed by the inlet flow passage 70 is adjustable by movement of the movable plate 54.

The movable plate 54 is slidable in a direction parallel to the stationary plate 56 selectively towards or away from the sidewall 24A of the housing 20. The selective sliding movement of the movable plate 54 selectively moves the bottom edge 66 closer or further from the sidewall 24A and thereby selectively varies the width and the size of the opening provided by the inlet flow passage 70. The movable plate 54 may be slid to a fully extended position wherein the bottom edge 66 abuts the sidewall 24A, or is in close proximity to the sidewall 24A, and a retracted position wherein the bottom edge 66 is spaced apart from the sidewall 24A. Selective movement of the movable plate 54 may thereby vary the width X of the inlet flow passage opening from closed, to 1/16 inch, and to 3 inches or larger. The length of the opening of the flow passage 70 remains substantially uniform no matter in what position the movable plate 54 is located. Adjustment of the size of the inlet flow passage 70 may thereby selectively vary the velocity of the liquid mixture 14 as it flows from the inlet chamber 52 into the settling chamber 22 while maintaining an approximately uniform rate of flow.

The selective adjustment or movement of the movable plate 54 may be accomplished by various means which are well known in the art. One such means includes connecting the movable plate 54 to the stationary plate 56 or housing 20 by an elongate member 72 attached at one end to the movable plate 54 and threadably attached at a second end to a rotatable screw member 74. The screw member 74 is rotatably attached to the stationary plate 56. Selective clockwise or counter-clockwise rotation of the screw member 74 will thereby selectively slide the movable plate 54 towards or away from the sidewall 24A and thereby increase or decrease the opening size of the inlet flow passage 70. Movement of the movable plate 54 may also be provided by one or more hydraulic cylinders. The left edge 62 and the right edge 64 of the movable plate 54 may be sealed to their respective sidewalls 24B and 24D by a gasket member (not shown) formed from a rubber or other elastomeric material to prevent the flow of the liquid mixture 14 around the edges 62 and 64 of the movable plate 54.

When the clarifying device 10 alternatively includes only the stationary plate 56, and not the moveable plate 54, the bottom edge 58 of the stationary plate 56 forms the inlet passage 70 which will have an opening of a constant size between the bottom edge 58 and the sidewall 24A. The bottom edge 58 of the first wall member 50 may be initially located various distances from the sidewall 24A as desired to provide an opening of the desired size.

A second wall member 80 is also located within the housing 20 and defines an outlet chamber 82. The second wall member 80 extends across the width of the clarifying device 10 between the sidewalls 24B and 24D. The second wall member 80 includes a left edge attached to the sidewall 24B and a right edge attached to the sidewall 24D. The second wall member 80 includes a generally planar plate member 84 having a bottom edge 86 and a spaced apart top edge 88. The top edge 88 is spaced below the top edge 26 of the sidewalls 24A–D. The plate member 84 is sloped at an approximate angle of 60° to the horizontal such that the bottom edge 86 is spaced farther apart from the sidewall 24C than is the top edge 88. The top edge 88 of the plate member 84 is spaced apart from the sidewall 24C thereby forming an outlet passage 90 into the outlet chamber 82. The outlet chamber 82 is in fluid communication with the outlet port 40 and the outlet pipe 44.

The second wall member 80 also includes a curved deflector member 92. The deflector member 92 extends between an edge 94, which is attached to the sidewall 24C of the housing 20, and the bottom edge 86 of the plate member 84. The deflector member 92 includes a concave portion which faces the settling chamber 22. The bottom edge 86 of the plate member 84 is located at approximately the same elevation as the bottom edge 58 of the stationary plate 56. The plate member 84 is substantially parallel to the stationary plate 56 and the movable plate 54.

The clarifying device 10 if desired may also include one or more settling units. Internal walls 96A and 96B extend generally perpendicular to and between the plate member 84 of the second wall member 80 and the stationary plate 56 of the first wall member 50. The internal walls 96A–B are parallel to one another and are equally spaced on respective sides of the center of the clarifying device 10 as best shown in FIG. 1. The internal walls 96A–B are generally vertical and planar plates attached at one end to the plate member 84 and at the other end to the stationary plate 56. The internal walls 96A–B extend from a bottom edge 98 located at approximately the same elevation as the bottom edge 86 of the plate member 84 and the bottom edge 58 of the stationary plate 56, and a top edge 100 located at approximately the same elevation as the top edge 60 of the stationary plate 56 and at or slightly below the top edge 26 of the sidewalls 24A–D. An end plate 102 extends vertically upwardly from the top edge 88 of the plate member 84 and between the internal walls 96A–B to the top edges 100 thereof. The internal walls 96A–B, the end plate 102 and the stationary plate 56 form an observation opening 104 therebetween to provide a view of and access to the settling chamber 22 through the top of the housing 20.

A first settling unit 106, illustrated in FIG. 1, is formed between the internal wall 96A, the stationary plate 56, the sidewall 24B and the plate member 84 of the second member 80. A second settling unit 108 is formed between the internal wall 96B, the stationary plate 56, the sidewall 24D and the plate member 84 of the second member 80. A plurality of settling members 110 are located within each settling unit 106 and 108. Each settling member 110 is a generally planar plate including a bottom edge 112 located adjacent the bottom edge 98 of the internal walls 96A or 96B and a top edge 114 located below the top edge 88 of the second wall member 80. The settling members 110 are sloped at an approximate angle of 60° to the horizontal and are located between and generally parallel to the stationary plate 56 and the plate member 84. The settling members 110 may be sloped at other angles as desired. The settling members 110 in the first settling unit 106 extend between and are connected to the sidewall 24B and the internal wall 96A. The settling members 110 located within the second settling unit 108 extend between and are connected to the sidewall 24D and the internal wall 96B. The settling members 110 are located above the settling chamber 22.

The settling members 110 in each settling unit 106 and 108 are spaced apart and generally parallel to one another such that adjacent settling members 110 form a fluid conduit 116 therebetween having a first end 118 located at the bottom edges 112 of the settling members 110 and a second end 120 located at the top edges 114 of the settling members 110. The first end 118 of each fluid conduit 116 is in fluid communication with the settling chamber 22. The second end 120 of each fluid conduit 116 is in fluid communication with the outlet chamber 82 and the outlet port 40. While the present invention has been described as including two settling units 106 and 108, the clarifying device 10 may alternatively include a single settling unit wherein the settling members 110 extend across the full width of clarifying device 10 between the sidewalls 24B and 24D. The clarifying device 10 could also include additional observation openings 104 and additional settling units if desired or no settling units. When the clarifying device 10 does not include a settling unit, the settling chamber 22 is in direct fluid communication with the outlet chamber 82.

A first adjustable weir plate 126 is attached to the top edge 88 of the plate member 84 and extends between the sidewall 24B and the internal wall 96A. A second adjustable weir plate 128 is attached to the top edge 88 of the plate member 84 and extends between the sidewall 24D and the internal wall 96B. The weir plates 126 and 128 include a top edge 130 which may be substantially linear or which may include various configurations of serrations. The weir plates 126 and 128 are selectively movable with respect to the plate member 84 to selectively adjust the elevation of the top edge 130.

A deflector member 136 is located within the lower portion of the housing 20 as best shown in FIG. 3. The deflector member 136 is a generally trapezoidal-shaped planar plate having a first edge 138, an opposing and parallel second edge 140, and two angled edges 142 extending therebetween. The first edge 138 of the deflector member 136 is pivotally attached to the sidewall 24A by a plurality of hinges 144. A sealing gasket (not shown) may extend along and between the first edge 138 and the sidewall 24A to prevent the liquid mixture 14 from flowing therebetween. The deflector member 136 is pivotal about the first edge 138 so that the deflector member 136 may be lowered to lie flat against the wall 32A of the base 30 or raised to any desired angle relative to the sidewall 24A. An elongate member 146, including a first end 148 pivotally attached to the deflector member 136, extends upwardly at an angle through the observation opening 104 to a second end 150 located above the top edge 100 of the internal walls 96A–B. The second end 150 is selectively connected to the internal walls 96A and 96B or to the end plate 102 by any of various means which are well known, such as screw mechanisms or hydraulic cylinders, to provide for the selective raising or lowering of the elongate member 146 which thereby pivots the deflector member 136.

In operation, the liquid mixture 14, which includes separated particles and which may be treated with a coagulant such as alum, flows through the inlet pipe 42 and through the inlet port 38 into the inlet chamber 52, as generally shown by the arrow A in FIG. 3. The liquid mixture 14 within the inlet chamber 52 has a liquid surface 160 which is located below the top edge 60 of the stationary plate 56. The liquid mixture 14 within the inlet chamber 52 flows towards the inlet flow passage 70 as shown by the arrow B.

The liquid mixture within the inlet chamber 52 flows through the inlet flow passage 70 into the settling chamber 22. The inlet flow passage 70 directs the liquid mixture 14 entering the settling chamber 22 to flow generally parallel and adjacent to the sidewall 24A as it enters the settling chamber 22. The width X and thereby the size of opening of the inlet flow passage 70 may adjusted by selectively moving the movable plate 54 and its bottom edge 66 towards or away from the sidewall 24A to selectively vary the velocity of the liquid mixture 14 as it enters the settling chamber 22 through the inlet flow passage 70. The orientation of the inlet flow passage 70, the orientation of the deflector member 136, and the orientation of the deflector member 92 cause the liquid mixture 14 within the settling chamber 22 to rotate in a generally clockwise direction, as shown by the arrow C in FIG. 3, about a generally horizontal axis 162. The inlet flow passage 70 directs the liquid mixture 14 entering the settling chamber 22 to flow tangentially and evenly into the rotating liquid mixture 14 within the settling chamber 22 thereby causing little or no disturbance to the rotating liquid mixture. The deflector plate 136 may be pivoted to any desired angle to control the rotation of the liquid mixture 14 within the settling chamber 22. The deflector plate 136 may also be pivoted to a position flat against the base 30 to allow the liquid mixture 14 flowing into the settling chamber 22 to scour the settled particles 12 within the base 30 away from the walls 32A–D.

As the liquid mixture 14 rotates within the settling chamber 22, the particles 12 of the liquid mixture 14 will agglomerate together forming larger particles with a larger mass which settle on the bottom of the base 30. If desired, additional flocculation or water treatment additives may be added to the liquid mixture 14 within the settling chamber 22 through the observation opening 104. When the clarifying device 10 includes settling units, the rotational pattern of the liquid mixture 14 within the settling chamber 22 directs particles 12 in the liquid mixture 14 to flow generally horizontally beneath the bottom edges 112 of the settling members 110. The particles 12 in the liquid mixture 14 have a specific gravity which is greater than the specific gravity of the liquid portion of the liquid mixture 14 and therefore the particles 12 tend to continue to flow in a generally horizontal direction beneath the bottom edges 112 of the settling members 110 while the liquid portion of the liquid mixture 14 turns greater than 90°, and preferably approximately 120°, to enter the first end 118 of the fluid conduits 116 formed between the settling members 110 as shown by the arrows D. The liquid which flows through the fluid conduits 116 flows in a generally linear direction from the first end 118 to the second end 120. Particles 12 which may enter the fluid conduits 116 settle on the settling members 110 and slide down the settling members 110 as their mass accumulates by agglomeration with other particles. The particles 12 that have accumulated a sufficient mass through agglomeration flow downwardly through the settling chamber 22, as shown by the arrow H, and settle on the bottom of the base 30 at the outlet port 34 as sludge. The settled particles or sludge may be periodically removed from the clarifying device 10 through the outlet port 34 by operation of the valve 36 and then through the outlet port 49B.

Particles 12 which have settled in the bottom of the base 30, and a portion of the liquid mixture in the chamber 22, may be recirculated through the settling chamber 22 to aid in the flocculation process. The pump 45 draws the settled particles 12 through the outlet port 34 of the base 30 and the outlet port 49A of the T-shaped pipe 48 into the inlet 46 of the pump 45, as shown by the arrow I. The pump 45 then causes the particles 12 and liquid mixture to flow out the outlet 47 of the pump 45 through the pipe 43 to the inlet pipe 42, as shown by the arrow J, and to flow through the inlet port 38 into the inlet chamber 52 for recirculation into the settling chamber 22. The pump 45 provides various flow rates of particles 12 through the pipe 43 into the inlet chamber 52 as desired. The pump 45 may thereby regulate the total flow of liquid and particles into the inlet chamber 52 by increasing or decreasing the rate of flow through the pump 45 and pipe 43, and thereby correspondingly regulate the velocity of the fluid flow through the fluid flow passage 70 while the opening of the fluid flow passage 70 remains a constant size.

The clarified liquid 16, liquid from which the particles 12 have been substantially removed, flows out of the second end 120 of the fluid conduits 116 and over the top edges 114 of the settling members 110 as shown by the arrows E. The clarified liquid 16 which flows out of the settling members 110 has a liquid surface 166 which is located below the top edge 100 of the internal walls 96A–B. The clarified liquid 16 from the settling members 110 flows over the top edge 130 of the weir plates 126 or 128, through the outlet passage 90 and into the outlet chamber 82.

When the clarifying device 10 does not include settling units, the clarified liquid will flow upwardly from the rotating mass of liquid mixture in the settling chamber 22 to an area above the rotating liquid mixture between the first wall member 56 and the second wall member 80, the area the settling units would otherwise occupy, which includes relatively calm liquid which forms the liquid surface 166. The clarified liquid 16 at the liquid surface 166 flows over the top edge 130 of the weir plates, through the outlet passage 90 and into the outlet chamber 82.

The clarified liquid 16 within the outlet chamber 82 has a liquid surface 168 which is located below the top edge 88 of the plate member 84. The clarified liquid 16 within the outlet chamber 82 flows towards the outlet port 40, as shown by the arrow F, and through the outlet pipe 44, as shown by the arrow G, for use or for any further treatment that may be desired.

Various features of the invention have been particularly shown and described in connection with the illustrated embodiments of the invention, however, it must be understood that these particular arrangements merely illustrate, and that the invention is to be given its fullest interpretation within the terms of the appended claims.

What is claimed is:

1. A device for separating particles from a mixture of particles and liquid to form a clarified liquid comprising:

a housing including an inlet port, a first outlet port and a second outlet port, said housing defining a settling chamber for receiving the mixture of particles and liquid, said first and second outlet ports being in fluid communication with said settling chamber;

a first wall member having a first end and a second end, said first wall member being associated with said housing adjacent said inlet port and defining an inlet chamber, said inlet port being in fluid communication with said inlet chamber, said inlet chamber having a first cross-sectional area at said first end of said first wall member and second cross-sectional area at said inlet port, said first cross-sectional area being smaller than said second cross-sectional area;

means for fully rotating the mixture within said settling chamber about a generally horizontal axis to promote the separation and settling of particles from the liquid in said settling chamber, said means for rotating including a flow passage located adjacent said first end of said first wall member for providing fluid communication between said inlet chamber and said settling chamber, whereby clarified liquid is removed from said housing through said first outlet port and separated particles are removed from said housing through said second port.

2. The device of claim 1 including a plurality of settling members located within said housing above said settling chamber, adjacent settling members forming a fluid conduit therebetween, each said fluid conduit having a first end in fluid communication with said settling chamber and a second end in fluid communication with said first outlet port.

3. The device of claim 1 wherein said flow passage is located adjacent said housing such that said flow passage directs the mixture flowing from said inlet chamber into said settling chamber adjacent to and along said housing.

4. The device of claim 1 wherein said first end of said first wall member includes a bottom edge, said bottom edge forming said flow passage.

5. The device of claim 1 including means for adjusting the velocity of the mixture flowing through said flow passage.

6. The device of claim 5 wherein said velocity adjustment means includes a moveable member associated with said first wall member, said moveable member having a bottom edge forming said flow passage, said bottom edge of said moveable member being selectively moveable to thereby selectively vary the size of said flow passage.

7. The device of claim 5 wherein said first wall member comprises a stationary member attached to said housing and said velocity adjustment means comprises a movable member selectively movable with respect to said stationary member, said movable member including a bottom edge that forms said flow passage.

8. The device of claim 7 including means for selectively moving said movable member.

9. The device of claim 5 wherein said velocity adjustment means comprises a pump having an inlet in fluid communication with said settling chamber and an outlet in fluid communication with said inlet chamber.

10. The device of claim 1 wherein said housing includes a sidewall and said flow passage extends substantially along the entire width of said sidewall.

11. The device of claim 1 including a flow deflector member attached to said housing below said flow passage, said flow deflector member adapted to assist in providing rotational movement of the mixture in said settling chamber about a generally horizontal axis.

12. The device of claim 11 wherein said first flow deflector member is pivotally attached to said housing.

13. The device of claim 12 including means for selectively pivoting said first flow deflector member to any of a plurality of desired positions.

14. The device of claim 11 including a second wall member located in said housing, said second wall member defining an outlet chamber within said housing, said outlet chamber being in fluid communication with said settling chamber and said first outlet port.

15. The device of claim 1 wherein said housing includes a base for collecting separated particles, said second outlet port being located in said base.

16. The device of claim 1 including a second wall member located in said housing, said second wall member defining an chamber within said housing, said outlet chamber being in fluid communication with said settling chamber and said first outlet port, said second wall member including a flow deflector member adapted to assist in providing rotational movement of the mixture in said settling chamber about a generally horizontal axis.

17. The device of claim 1 including a pump having an inlet in fluid communication with said settling chamber and an outlet which provides fluid flow into said settling chamber.

18. A method of separating particles from a mixture of particles and liquid to form a clarified a liquid comprising the steps of:

providing a flow of the mixture into an inlet chamber formed by a wall member having a first end and a second end, said inlet chamber having a first cross-sectional area at said first end of said wall member and a second cross-sectional area at said second end of said wall member, said first cross-sectional area being smaller than said second cross-sectional area;

providing a flow of the mixture from said inlet chamber through a flow passage located adjacent said end of said wall member of said inlet chamber into a settling chamber formed by a housing;

fully rotating the mixture within the settling chamber about a generally horizontal axis to separate the particles from the liquid; said passing the clarified liquid from the settling chamber through an outlet port of removal from the housing.

19. The method of claim 18 including the step of directing the flow of the mixture entering into the settling chamber through the flow passage to flow tangentially into the rotating mixture within the settling chamber.

20. The method of claim 18 including the step of selectively adjusting the size of the flow passage to adjust the velocity of the mixture entering the settling chamber.

21. The method of claim 18 including the step of passing the liquid of the mixture from the settling chamber through a plurality of settling members wherein particles remaining in the liquid separate from the liquid to form clarified liquid.

22. The method of claim 21 including the step of changing the direction of flow of the liquid of the mixture in the settling chamber by at least ninety degrees as the liquid of the mixture flows from the settling chamber into the settling members.

23. The method of claim 18 including the step of controlling the rotation of the mixture in the settling chamber by adjusting a deflector member located within the settling chamber.

24. The method of claim 18 including the step of removing settled particles from the settling chamber and recirculating the settled particles into the rotating mixture within the settling chamber.

* * * * *